United States Patent
Gugsch et al.

(10) Patent No.: US 6,241,223 B1
(45) Date of Patent: Jun. 5, 2001

(54) ELASTIC MOUNT, ESPECIALLY AN ENGINE MOUNT FOR MOTOR VEHICLES

(75) Inventors: Mathias Gugsch, Strassenhaus; Edison Fatehpour, Koblenz, both of (DE)

(73) Assignee: Trelleborg Automotive Technical Centre GmbH, Hoehr-Grenzhausen (DE)

(*) Notice: Subject to any disclaimer, the term of this patent is extended or adjusted under 35 U.S.C. 154(b) by 0 days.

(21) Appl. No.: 09/665,758

(22) Filed: Sep. 20, 2000

Related U.S. Application Data

(63) Continuation of application No. PCT/EP99/01929, filed on Mar. 22, 1999.

(30) Foreign Application Priority Data

Mar. 20, 1998 (DE) ............................................. 198 12 387

(51) Int. Cl.[7] ............................. F16F 3/087; F16F 1/36; F16F 13/26

(52) U.S. Cl. ............... 267/140.13; 267/219; 267/140.14; 267/140.3

(58) Field of Search .......................... 267/140.13, 140.11, 267/140.12, 140.15, 140.14, 219, 220, 292, 140.5, 294, 140.3, 218; 180/312, 902, 300, 297, 291; 248/567, 562, 636, 582, 583, 605, 595, 577, 632; 188/321.11

(56) References Cited

U.S. PATENT DOCUMENTS 4,399,974 * 8/1983 Takei .
4,415,148 * 11/1983 Mair et al. ....................... 267/140.13
4,830,346 * 5/1989 Eberhard et al. ..................... 267/219
4,984,777 * 1/1991 Kurr et al. ....................... 267/140.13
5,213,315 * 5/1993 Härtel et al. ..................... 267/140.11
5,299,789 * 4/1994 Winkler et al. .................. 267/140.14
5,820,113 * 10/1998 Laughlin ......................... 267/140.15

FOREIGN PATENT DOCUMENTS

1104766 * 4/1961 (DE) .
4139046 * 6/1993 (DE) .
9949235 * 9/1999 (WO) .

* cited by examiner

*Primary Examiner*—Douglas C. Butler
(74) *Attorney, Agent, or Firm*—Herbert L. Lerner; Laurence A. Greenberg; Werner H. Stemer

(57) ABSTRACT

An elastic mount, especially an engine mount for motor vehicles includes at least two resilient elements connected in parallel to each other. Through force applicators, the two resilient elements are connected selectively to a source of vibration. The mount includes a coupler for selectively engaging the force applicators with the resilient elements. The coupler includes a first coupling element and a second coupling element selectively connectable by an actuator to ensure that only low travel and force components are needed for selection and to ensure that an axial decoupling of the non-effective resilient element exists in the released condition. The second coupling element swivels to be selectively connected to the first coupling element by the actuator. The second coupling element is connectable to the force applicator of the second coupling element in the engaged condition and is configured as a rotary body swivelably mounted in the released condition.

20 Claims, 4 Drawing Sheets

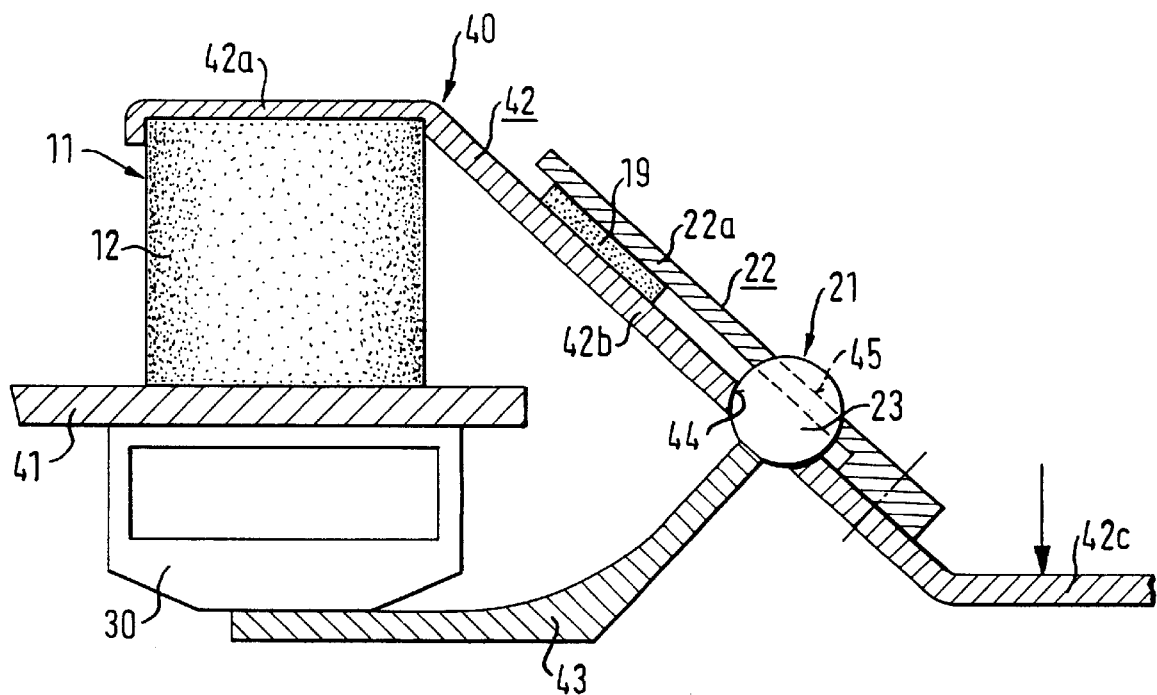
FIG. 7
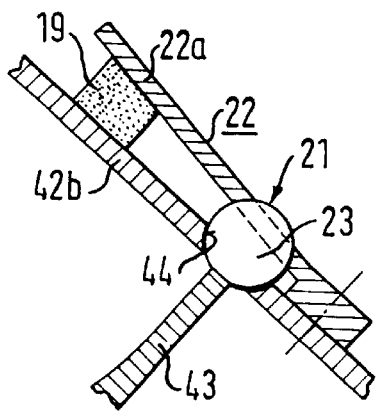
FIG. 8
FIG. 9

ELASTIC MOUNT, ESPECIALLY AN ENGINE MOUNT FOR MOTOR VEHICLES

CROSS-REFERENCE TO RELATED APPLICATION

This application is a continuation of International Application No. PCT/EP99/01929, filed Mar. 22, 1999, which designated the United States, published on Sep. 30, 1999 as WO99/79234.

BACKGROUND OF THE INVENTION

Field of the Invention

The invention relates to an elastic mount, especially, an engine mount for motor vehicles. The mount includes at least two resilient elements connected in parallel to each other, a force applicator connecting a source of vibration to the at least two resilient elements, and a selectable couple for connecting the force applicator thereto.

An elastic mount is disclosed in German Published, Non-Prosecuted Patent Application DE 41 28 761.4 A, corresponding to U.S. Pat. No. 5,213,315 to Hartel et al. In the Hartel configuration, two resilient elements are connected in parallel. Each of the elements has an elastomeric resilient body. One of the resilient bodies is configured as a tubular cylinder and accommodates the second resilient body in its interior. The interior resilient element is a force applicator that is selectable by a couple to enable a variance of the stiffness of the elastic mount as a function of the vehicle ride. The couple includes a coupling element defined on the resilient element. The coupling element is force-lockingly connectable to a second coupling element. A force-locking connection is one that connects two elements together by force external to the elements, as opposed to a form-locking connection, which is provided by the shapes of the elements themselves. A hydraulically activated diaphragm achieves the change in movement. In the prior art engine mount, the travel and force components needed to select the coupling elements are relatively high. Furthermore, in the released condition, no axial decoupling of the second resilient element is provided.

German Published, Non-Prosecuted Patent Application DE 41 39 046 A discloses another engine mount in which the resilient element is configured as an elastomeric tubular cylinder disposed between a mounting plate at the engine end and a mounting plate at the vehicle body end. Provided below the mounting plate at the vehicle body end is a hydraulic damping mount configured as a two-chamber mount. While the tubular cylindrical resilient block produces high damping of material-borne noise, the parallel-connected hydraulic mount serves to damp low-frequency vibration. The application does not provide for or disclose a stiffness selection for the engine mount.

SUMMARY OF THE INVENTION

It is accordingly an object of the invention to provide an elastic mount, especially, an engine mount for motor vehicles, that overcomes the hereinafore-mentioned disadvantages of the heretofore-known devices of this general type and that reduces the travel and force components needed to select the coupler and provides an axial decoupling of the non-active resilient element in the released condition.

With the foregoing and other objects in view, there is provided, in accordance with the invention, an elastic mount including at least two resilient elements connected in parallel to each other, force applicators for selectively connecting a source of vibration to the at least two resilient elements, the force applicators including a first force applicator and a second force applicator, and a coupler for selectively engaging the force applicators with the at least one resilient element, the coupler having an actuator, a first coupling element, and a swiveling second coupling element to be selectively connected to the first coupling element by the actuator, the second coupling element connected to one of the force applicators and to at least one of the two resilient elements in an engaged condition, and swivelably mounted in a released condition.

With the objects of the invention in view, the elastic mount is an elastic engine mount for motor vehicles.

The invention provides an engine mount having a coupler with first and second coupling elements connectable by an actuator. The second coupling element is connectable to the force applicator of the second coupling element in the engaged condition and the second coupling element is configured as a rotary body swivelably mounted in the released condition.

The mount of the invention can be achieved, in principle, with many different kinds of resilient elements. More particularly, at least two conventional resilient elements incorporating elastomeric resilient bodies and a hydraulic damping mount may be used. The resilient body of the resilient element may be configured as a tubular cylinder. In addition, the resilient element may include at least two opposite resilient bodies each having a wedge-shape. In the embodiment, there is an advantage when the resilient element extends primarily in one direction in space. Furthermore, the stiffness is variable both transversely and longitudinally. The invention further provides facilitated tuning of the load/deflection characteristic.

Common to all embodiments is a selectable control of a stiffness of at least one resilient element. The coupler in accordance with the invention is characterized by low travel and force components needed for its selection. Furthermore, the second coupling element used in the coupler ensures axial decoupling of the second resilient element in the released condition. In the engaged condition, the advance of the first coupling element to the second coupling element produces a force-locking connection between the second coupling element and the force applicator. Because the second coupling element is configured as a rotary body swivelably mounted in the released condition, the second resilient element is able to execute a tilting movement when radially loaded. The movement results in substantially no hydraulic effects occurring in radial loading of a resilient element configured, more particularly, as a hydraulic damping mount. Thus, the radial stiffness in the released condition is reduced.

Advantageously, one of the at least two resilient elements has a dished mount for swivel-mounting the second coupling element, and the second coupling element is a spherical body accommodated in the dished mount.

In one advantageous embodiment, the second coupling element is a receiver for the second force application element, the opening cross-section of which is variable for force-lockingly engaging the second force application element and the shape of which defining the second force application element.

In accordance with another feature of the invention, the second coupling element can include at least one slit that is closed by the first coupling element in the engaged condition. Advantageously, the coupling element is made of brass or some other bearing metal.

In accordance with a further feature of the invention, the first coupling element includes a receiving opening adapted to the outer contour of the second coupling element. In the engaged condition, the second coupling element is then located at least in part in the receiving opening. The clamping mechanism may be configured alternatively with a shell clamp, the diameter of which is variable by an actuator through a setscrew. Due to the conical seating of the mount shells in the shell clamp, the radial force of the setscrew can be diverted into an axial force acting on the mount shells. The angle of the conical seat in the configuration permits a translation in the active force.

In accordance with an added feature of the invention, the actuator may be an electric, piezoelectric, pneumatic, or hydraulic actuator. In all variants, the configuration of the couple in accordance with the invention advantageously allow only low travel and force components to occur in selection.

In accordance with an additional feature of the invention, the first resilient element is an elastomeric resilient body and the second resilient element is a hydraulic damping mount. It is expedient to have the hydraulic damping mount be selectable in the configuration.

In accordance with yet another feature of the invention, the resilient body is a tubular cylinder accommodating the hydraulic damping mount in its interior. Such a configuration provides a compact elastic mount.

In accordance with yet a further feature of the invention, each of the at least two resilient elements can be an elastomeric resilient body. In the configuration, too, at least one of the two resilient elements can be selectable by the couple in accordance with the invention for varying the stiffness.

In accordance with yet an added feature of the invention, the first resilient element includes a mounting plate, on which is a dished mount for swivel-mounting the second coupling element, to thus achieve a hinged configuration of the force application element of the hydraulic damping mount in the released condition.

In accordance with yet an additional feature of the invention, the mounting plate is provided with a tubular cylindrical appendage in which the first coupling element is guided.

In accordance with again another feature of the invention, the second force applicator is configured as a round pin protruding from a mounting core of the second resilient element.

In accordance with again a further feature of the invention, the second coupling element may be configured as a spherical resilient body having an axially drilled hole for accommodating the second force application element.

In accordance with again an added feature of the invention, the resilient body may include at least one slit such that in the released condition the drilled hole has a cross-section permitting axial decoupling of the hydraulic damping mount. In addition, a tilting movement of the force applicator of the hydraulic damping mount is made possible when radially loaded, as a result of which no hydraulic damping effects substantially occur.

In accordance with again an additional feature of the invention, one of the resilient elements has a dished mount for swivel-mounting the second coupling element, and the first force applicator is a clamping arm selectively connected to the first resilient element. The clamping arm may be disposed, for example, at the engine end while a mounting plate disposed between the resilient element and the hydraulic damping mount is defined at the vehicle body end.

In accordance with still another feature of the invention, the second coupling element is a rotary body connected to the second force applicator and the rotary body defines an opening for receiving the first coupling element. Through the first coupling element, the second coupling element may be defined as a force-lock, which results in the second force application element being defined at the first force application element.

In accordance with a concomitant feature of the invention, the first coupling element is defined by the clamping arm and has a resilient arm passing through the opening in the second coupling element, the resilient arm being actuated by an actuator such that the two force applicators are connected to each other in a force-locking way.

Other features that are considered as characteristic for the invention are set forth in the appended claims.

Although the invention is illustrated and described herein as embodied in an elastic mount, especially an engine mount for motor vehicles,, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 7 is a partially sectional, view of a second embodiment of an elastic mount according to the invention;

FIG. 8 is a fragmentary, partially sectional view of the coupler for the elastic mount of FIG. 7 in an engaged condition; and FIG. 9 is a fragmentary, partially sectional view of the coupler for the elastic mount of FIG. 7 in a released condition.

DESCRIPTION OF THE PREFERRED EMBODIMENTS

Figure 1:
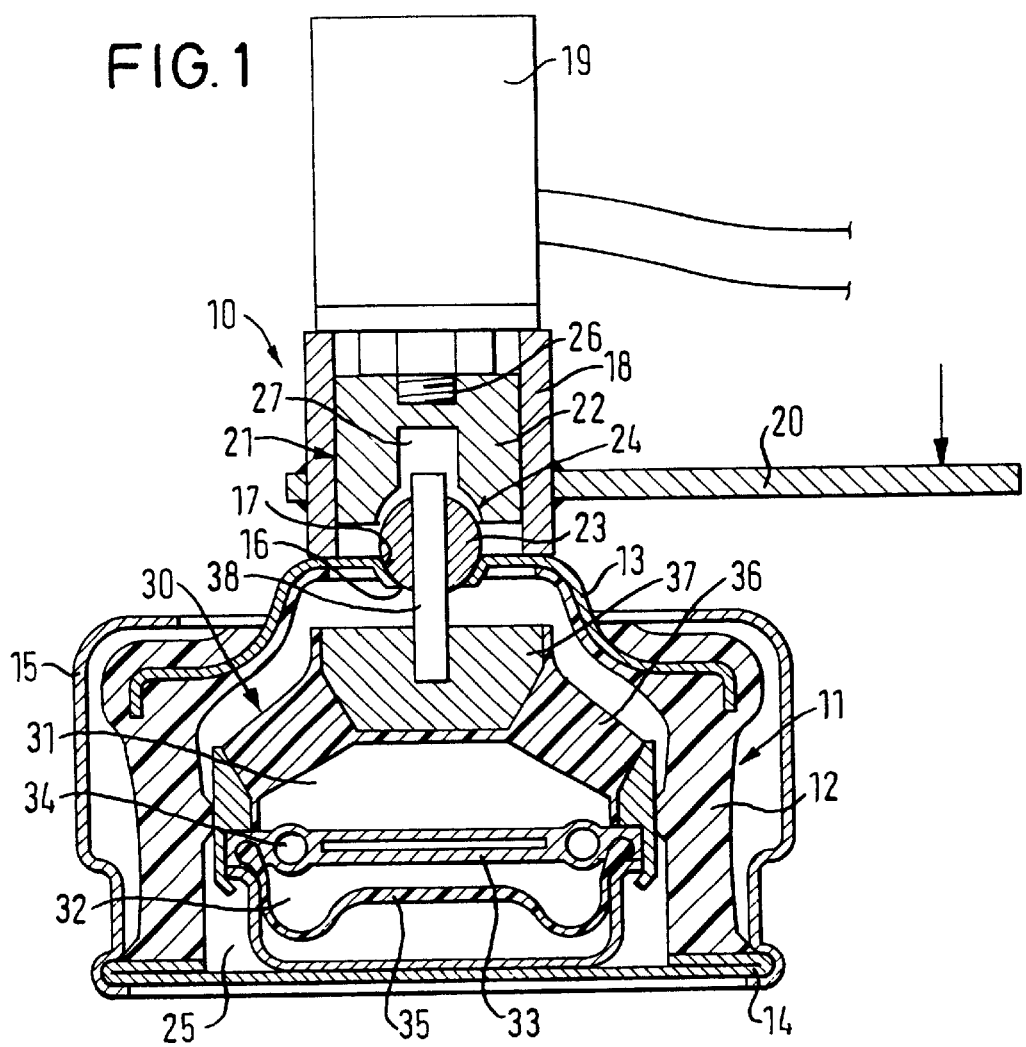
FIG. 1 is a partially sectional view of a first embodiment of an elastic mount according to the invention.

In all the figures of the drawing, sub-features and integral parts that correspond to one another bear the same reference symbol in each case.

Referring now to the figures of the drawings in detail and first, particularly to FIG. 1 thereof, there is shown a vertical section through an engine mount 10 in accordance with the invention having a conventional first resilient element 11 and a second resilient element 30 configured as a hydraulic damping mount. The two resilient elements 11, 30 are connected in parallel. The first force applicator 18, 20 at the engine end is connected to the second force applicator 38 of the hydraulic damping mount 30 through a coupler 21.

The first resilient element 11 is an elastomeric tubular cylindrical resilient body 12. Disposed at each end portion of the resilient body 12 is a respective mounting plate 13, 14. The mounting plate 13 is bell-shaped and has an opening 16 in which is configured a dished mount 17.

Disposed at the outer circumference of the resilient body 12 is a pot-shaped housing 15 defining the outer circumference of the mounting plate 14.

Accommodated in the interior 25 formed by the tubular cylindrical resilient body 12 is the hydraulic damping mount 30 with a conventional configuration. The mount 30 has two chambers including a working chamber 31 and a compensating chamber 32 separated from each other by an intermediate plate 33. The fluid-filled chambers 31, 32 communicate through an overflow passage 34. The compensating chamber 32 has a bottom defined by an elastomeric diaphragm 35. The working chamber 31 includes an elastomeric supporting spring 36 accommodating a mounting core 37. Protruding from the mounting core 37 is a round pin 38 that passes through the opening 16 in the mounting plate 13 of the resilient element 11.

The first force applicator disposed at the engine end is formed by the supporting arm 20 and the tubular cylindrical appendage 18 defined therein. The supporting arm 20 is welded to the appendage 18.

Accommodated in the tubular cylindrical appendage 18 is a coupler 21 including a first coupling element 22 slidingly guided by the inner wall of the appendage 18. The first coupling element 22 is connected to an actuator 19 that may be, for example, a solenoid positioner. The actuator 19 is connected to the first coupling element 22 through a setscrew 26.

Figure 2:
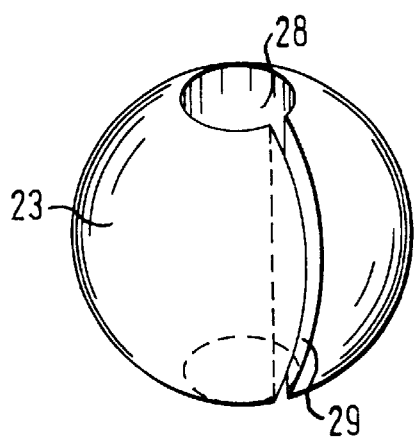
FIG. 2 is a perspective view of a spherical coupling element of the elastic mount of FIG. 1.

The first coupling element 22 includes a receiving opening 24, the outer contour of which is adapted to the spherical second coupling element 23. The receiving opening is a drilled hole 27 permitting axial insertion of the round pin 38. The coupling element 23 is made of a suitable mounting material. FIG. 2 illustrates a magnified spherical second coupling element 23. The coupling element 23 has a receiving hole 28 configured as an axial drilled hole for receiving the round pin 38. In addition, the coupling element 23 has a slit 29 axially passing through the coupling element 23. Due to the slit 29, the cross-section of the receiving hole 28 is expanded such that the round pin 38 in the released condition has freedom of movement both axially and radially. As a result, the configuration achieves a decoupling of the hydraulic damping mount 30 in the released condition.

On actuation by the actuator 19, the first coupling element 22 is made to engage the second coupling element 23 by the setscrew 26. The domed receiving opening 24 engaging the second coupling element 23 closes the slit 29. In the engaged coupling condition, the round pin 38 is force-lockingly engaged by and a shape of which is defined by the reduction in the cross-section of the receiving hole 28. The vibrations at the engine end are, thus, transmitted to the hydraulic damping mount 30 through the coupler 21.

Figure 3:
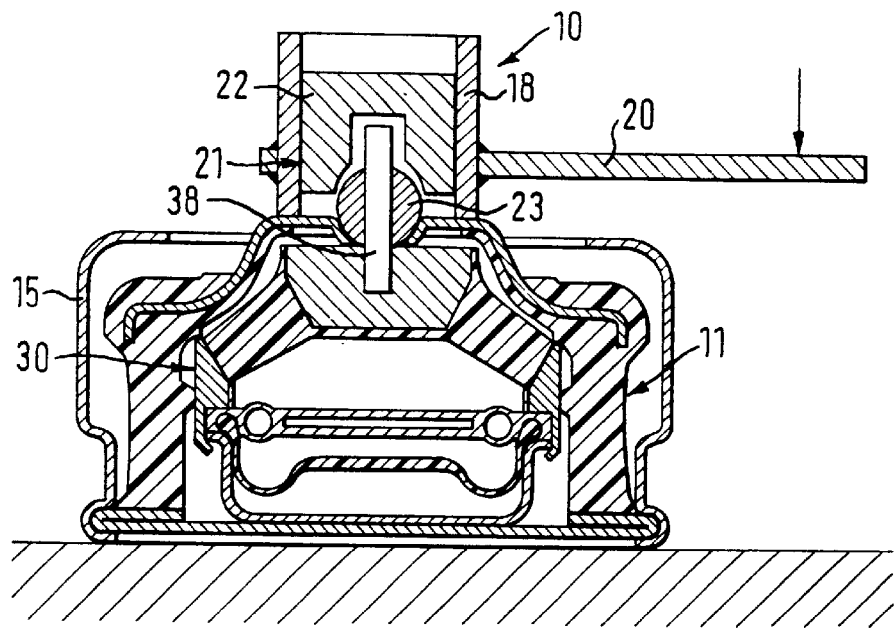
FIG. 3 is a cross-sectional view of the elastic mount of FIG. 1 in a released condition with axial loading.

The functioning of the engine mount in accordance with the invention in the released and engaged condition of the coupler is explained in detail below with reference to FIGS. 3 to 6. FIG. 3 illustrates the engine mount 10 in the released condition of the coupler, in which the supporting arm 20 is loaded only axially. Because the coupler 21 is in the released condition, the coupling elements 22, 23 are not engaged.

Thus, vibrations at the engine end are absorbed only by the conventional resilient element 11. The hydraulic mount 30 is axially decoupled. The round pin 38 of the mount 30 is able to axially move with no restriction. In addition, the coupling element permits a tilting movement of the round pin 38 when radially loaded, which, however, has no hydraulic effect. As a result, the radial stiffness is reduced in the released condition.

Figure 4:
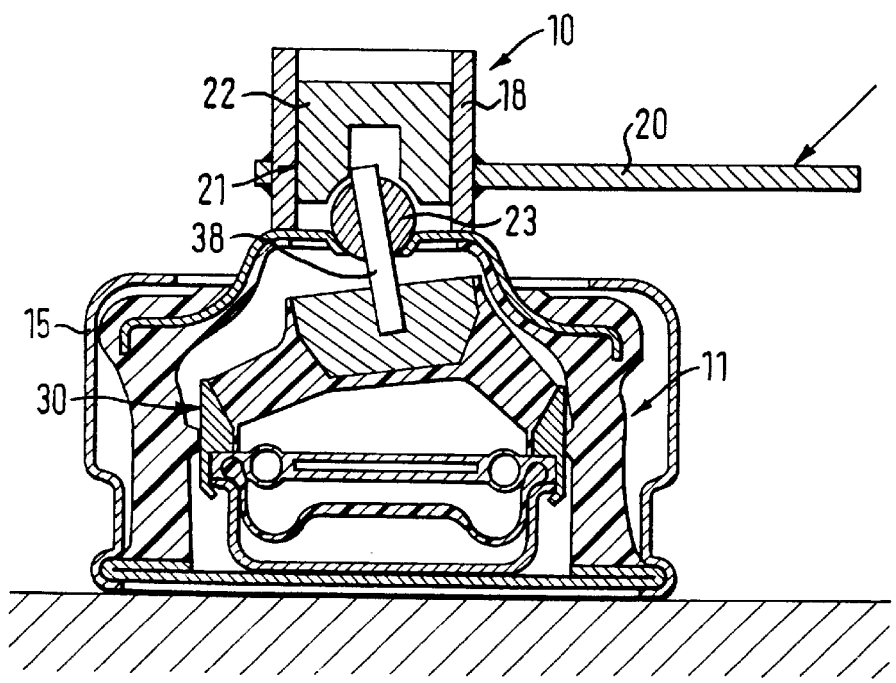
FIG. 4 is a cross-sectional view of the elastic mount of FIG. 1 in the released condition with combined axial and radial loading.

FIG. 4 illustrates what effect a radial loading of the supporting arm 20 has when the coupler 21 is in the released condition. Specifically, the resilient element 11 deflects the forces introduced into the system and is supported by the inner wall of the housing 15. The radial decoupling of the hydraulic damping mount 30 is achieved because the round pin 38 is pivotable due to the spherical second coupling element 23.

Figure 5:
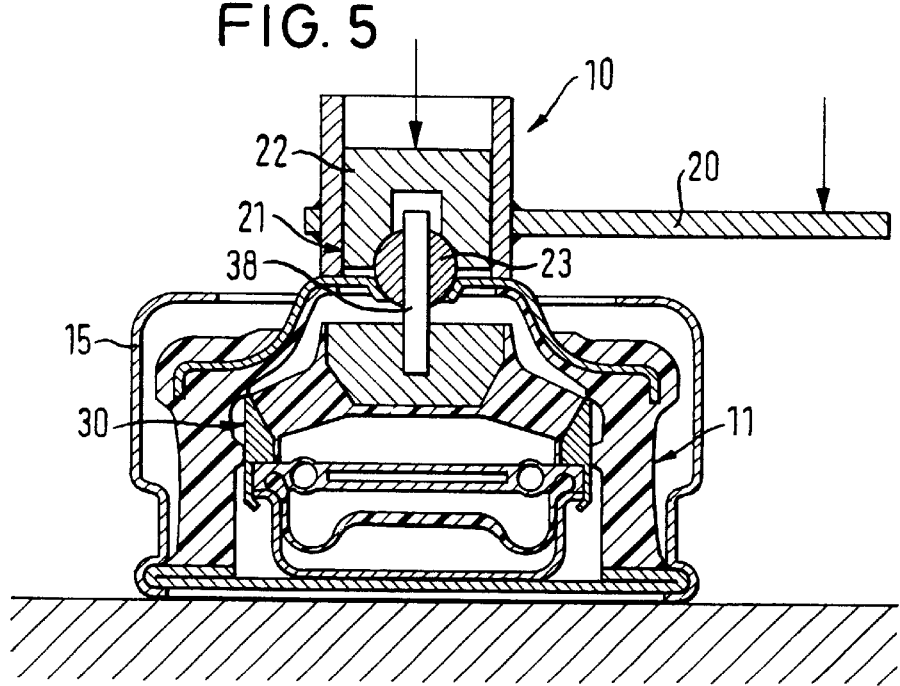
FIG. 5 is a cross-sectional view of the elastic mount of FIG. 1 in an engaged condition with axial loading.
Figure 6:
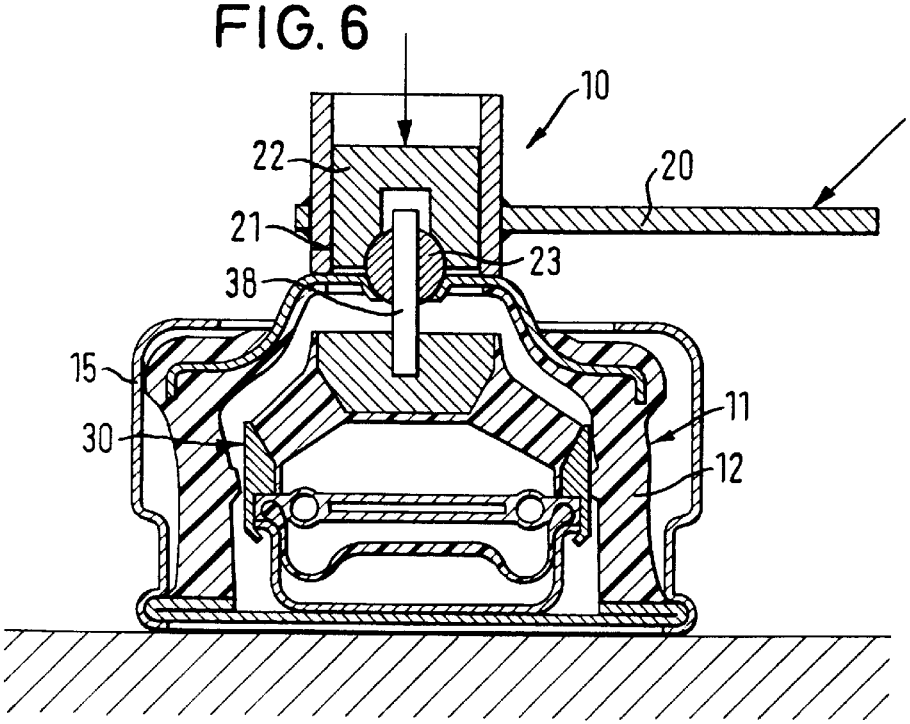
FIG. 6 is a cross-sectional view of the elastic mount of FIG. 1 in the engaged condition with axial and radial loading.

FIGS. 5 and 6 illustrate the engine mount 10 when the coupler 21 is engaged. In the engaged position, the first coupling element 22 of the coupler 21 engages the second coupling element 23 to produce a force-locking connection between the supporting arm 20 at the engine end and the round pin 38 of the hydraulic damping mount 30. Thus, axial vibrations at the engine end are effectively damped because the resilient element 11 is connected in parallel with the hydraulic damping mount 30.

In the operating mode shown in FIG. 6, radial forces are also introduced into the system through the supporting arm 20. When the coupler 21 is engaged, the resilient element 11 can radially deflect and contact the inner wall of the housing 15, causing the housing of the hydraulic damping mount 30 to contact the inner wall of the tubular cylindrical resilient body 12.

FIG. 7 illustrates a further engine mount 40 in accordance with the invention. Therein, like reference numerals identify like parts, or like functions.

The engine mount 40 is made up of a resilient element 11 including an elastomeric resilient body 12 and a hydraulic damping mount 30 connected in parallel thereto. Disposed between the first resilient element 11 and the mount 30 is a plate-shaped vehicle body bracket 41. For an engine end connection, the resilient element 11 is assigned a clamping arm 42 made of a fastener portion 42a defined at a face end of the resilient body 12. A dished mount 44 is incorporated in an adjoining inclined portion 42b. Adjoining the inclined portion 42b is a portion 42c for securing to the engine end.

A dished mount 44 for the spherical second coupling element 23 of the coupler 21 is incorporated in the inclined portion 42b of the clamping arm 42. In addition, the coupler 21 has a first coupling element 22 configured with a resilient arm 22a defined at the end by the clamping arm 42. The resilient arm 22a passes through an opening 45 provided in the second coupling element 23. An end portion of the resilient arm 22a is connectable to the clamping arm 42 through an actuator 19 that is configured, for example, as a piezoelement.

A second clamping arm 43 contacting the hydraulic damping mount 30 is defined at the second coupling element 23.

Functioning of the coupler 21 will now be described with reference to FIGS. 8 and 9.

FIG. 8 illustrates the coupler 21 in the engaged condition. The actuator 19 splays the resilient arm 22a of the first coupling element 22 such that the second coupling element 23 is fixed in place. Such fixing also fixes the position of the second clamping arm 43.

FIG. 9 illustrates how the coupler 21 permits a pivoting deflection of the clamping arm 43 in the released condition, thus resulting in only the resilient element 11 being effective in the released condition.

We claim:

1. An elastic mount, comprising:
    at least two resilient elements connected in parallel to each other;
    force applicators for selectively connecting a source of vibration to said at least two resilient elements, said force applicators including a first force applicator and a second force applicator; and
    a coupler for selectively engaging said force applicators with said at least two resilient elements, said coupler having:
        an actuator;
        a first coupling element; and
        a swiveling second coupling element to be selectively connected to said first coupling element by said actuator, said second coupling element connected to one of said force applicators and to at least one of said two resilient elements in an engaged condition, and swivelably mounted in a released condition.

2. The elastic mount according to claim 1, wherein one of said at least two resilient elements has a dished mount for swivel-mounting said second coupling element, and said second coupling element is a spherical body accommodated in said dished mount.

3. The elastic mount according to claim 1, wherein said second coupling element has a receiver for receiving said one of said force applicators, said receiver defines an opening with a variable opening cross-section, a shape of which approximately defines a shape of said one of said force applicators, and said opening engages said one of said force applicators in a force-lock.

4. The elastic mount according to claim 1, wherein said second coupling element has at least one slit to be closed by said first coupling element in the engaged condition.

5. The elastic mount according to claim 1, wherein said second coupling element has an outer contour, and said first coupling element has a receiving opening adapted to said outer contour.

6. The elastic mount according to claim 1, wherein said actuator is at least one of electric, piezoelectric, pneumatic, and hydraulic.

7. The elastic mount according to claim 1, wherein one of said at least two resilient elements is an elastomeric resilient body and another of said at least two resilient elements is a hydraulic damping mount.

8. The elastic mount according to claim 7, wherein said resilient body is approximately a tubular cylinder having an interior accommodating said hydraulic damping mount therein.

9. The elastic mount according to claim 1, wherein each of said at least two resilient elements is an elastomeric resilient body.

10. The elastic mount according to claim 1, wherein one of said at least two resilient elements has a mounting plate with a dished mount for swivel-mounting said second coupling element thereon.

11. The elastic mount according to claim 10, including an approximately tubular cylindrical appendage having an interior and disposed on said mounting plate, a shape of said interior approximately guiding said first coupling element.

12. The elastic mount according to claim 1, wherein one of said at least two resilient elements has a mounting core, and said second force applicator is an approximately round pin protruding from said mounting core.

13. The elastic mount according to claim 1, wherein said second coupling element is a spherical body defining a hole for accommodating said second force applicator.

14. The elastic mount according to claim 12, wherein said second coupling element is a spherical body defining a hole for accommodating said second force applicator.

15. The elastic mount according to claim 13, wherein said hole is an axially drilled hole.

16. The elastic mount according to claim 14, wherein said spherical body has at least one slit, said one of said at least two resilient elements is a hydraulic damping mount, and said hole has a cross-section permitting axial decoupling of said hydraulic damping mount in the released condition.

17. The elastic mount according to claim 1, wherein one of said at least two resilient elements has a dished mount for swivel-mounting said second coupling element, and said first force applicator is a clamping arm selectively connected to said one of said at least two resilient elements.

18. The elastic mount according to claim 17, wherein said second coupling element is a rotary body connected to said second force applicator and said rotary body defines an opening for receiving said first coupling element.

19. The elastic mount according to claim 18, wherein said first coupling element is disposed at said clamping arm, said first coupling element has a resilient arm passing through said opening in said rotary body, and said actuator actuates said resilient arm to selectively connect said first and second force applicators to each other in a force-lock.

20. An elastic engine mount for motor vehicles, comprising:
    at least two resilient elements connected in parallel to each other;
    force applicators for selectively connecting a source of vibration to said at least two resilient elements, said force applicators including a first force applicator and a second force applicator; and
    a coupler for selectively engaging said force applicators with said at least two resilient elements, said coupler having:
        an actuator;
        a first coupling element; and
        a swiveling second coupling element to be selectively connected to said first coupling element by said actuator, said second coupling element connected to one of said force applicators and to at least one of said at least two resilient elements in an engaged condition, and swivelably mounted in a released condition.

* * * * *